United States Patent [19]
Goss

[11] Patent Number: 5,337,615
[45] Date of Patent: Aug. 16, 1994

[54] FLOW METER

[76] Inventor: Jack Goss, 1717 Winfield Rd. South, Clearwater, Fla. 34616

[21] Appl. No.: 136,465

[22] Filed: Oct. 15, 1993

[51] Int. Cl.$^5$ ............................................. G01F 1/06
[52] U.S. Cl. .............................. 73/861.33; 73/861.77
[58] Field of Search ........... 73/861.32, 861.33, 861.77, 73/861.79, 861.81

[56] References Cited

U.S. PATENT DOCUMENTS

| | | | |
|---|---|---|---|
| 3,447,373 | 6/1969 | McNabb | 73/861.33 |
| 3,927,568 | 12/1975 | Hoppe | 73/861.33 |
| 4,015,474 | 4/1977 | Hoppe | 73/861.33 |
| 4,324,144 | 4/1982 | Miyata et al. | 73/861.77 |
| 4,378,703 | 4/1983 | Furness et al. | 73/861.79 |
| 4,395,919 | 8/1983 | Peters | 73/861.77 |
| 4,833,925 | 5/1989 | Bullock et al. | 73/861.79 |
| 4,887,469 | 12/1989 | Shoptaw | 73/861.77 |
| 5,226,329 | 7/1993 | Peters | 73/861.33 |

*Primary Examiner*—Richard E. Chilcot, Jr.
*Assistant Examiner*—Harshad Patel
*Attorney, Agent, or Firm*—David Kiewit

[57] ABSTRACT

A fluid volumetric flow sensor has relaxed dimensional tolerances when compared to prior art devices of the type in which a swirl, imparted to the fluid by channels in a housing, causes a rotor to spin. The rate at which the rotor spins may be measured by allowing the rotor lobes to interrupt an optical beam generated by a clip-on opto-electric module. The swirl-inducing channels that cause rotor motion lead from an inlet chamber into a small volute chamber that is upstream of and separate from the rotor chamber. Fluid impinging on a thrust reverser at the downstream end of the rotor chamber provides a fluid support so that the rotor is entirely supported by flowing fluid at normal flow rates. The thrust reverser may be a bluff body formed on a tension shaft that is attached to and extends downstream from a wall of the volute chamber through an axial lumen in the rotor body.

16 Claims, 2 Drawing Sheets

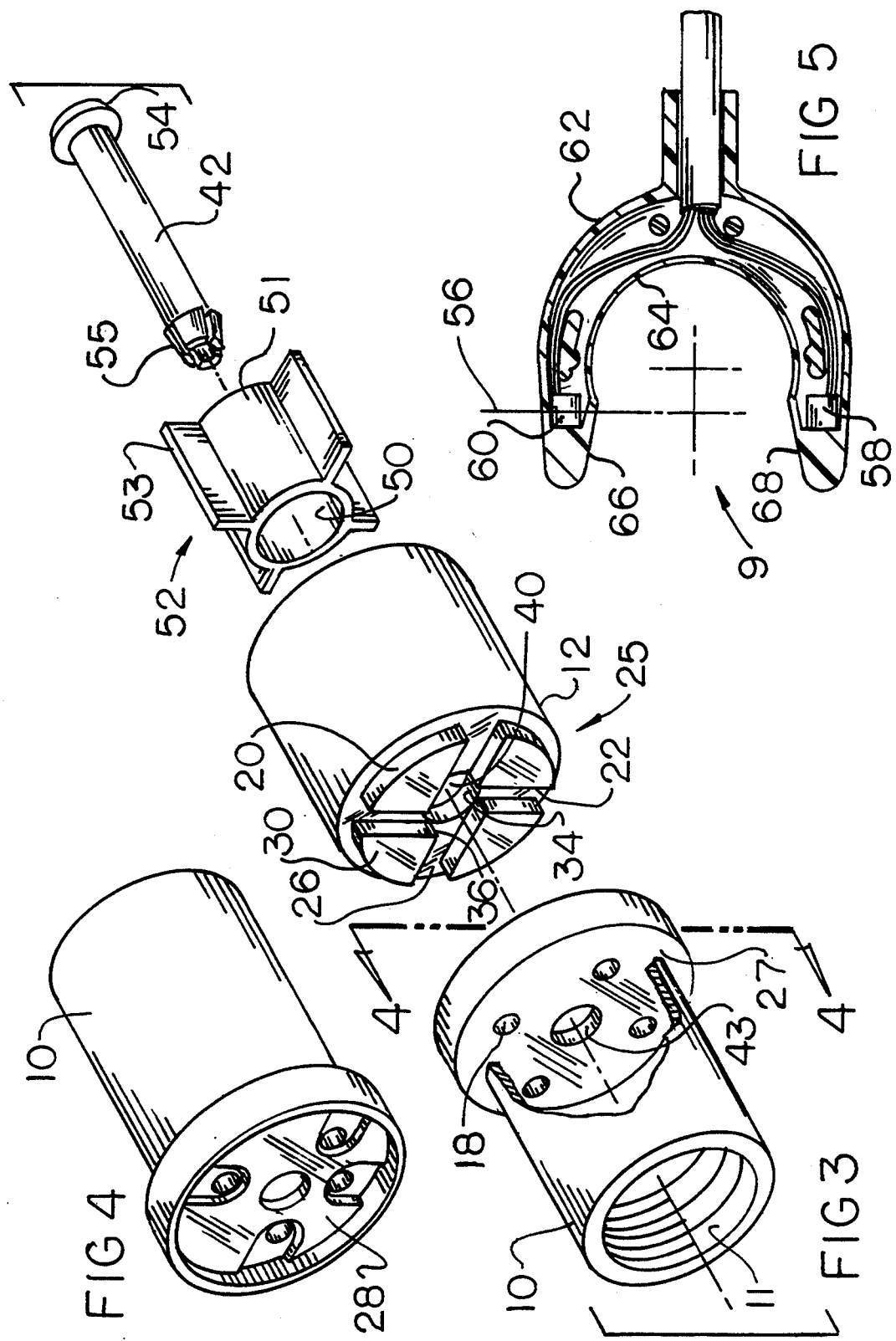

FLOW METER

BACKGROUND OF THE INVENTION

This invention relates to fluid volumetric flow sensors that employ rotating elements, and particularly to improvements in the rotor support.

Numerous devices have been proposed for measuring volumetric flow of fluids. Many of these use a rotating element supported on a bearing or bearings. Bearings in these meters have historically been expensive to make, fragile (particularly with respect to overspeed damage), and prone to both wear and corrosion.

McNabb, in U.S. Pat. No. 3,447,373, provided seminal teaching of a "bearingless", or liquid bearing, flowmeter in which the moving fluid not only rotated a wheel element in a chamber, but also held the rotor element out of contact with the walls of the chamber. The disclosure of McNabb is herein incorporated by reference.

As a matter of practice, dimensional tolerances on the order of 2.5 $\mu$m (0.0001 inch) are required for a meter of the McNabb design to function satisfactorily. McNabb meters are plagued with instabilities traceable to small dimensional variations. Specifically identified instabilities include:

axial wobble, in which the rotor oscillates about an axis perpendicular to its normal axis of rotation;

planar wobble, in which the rotor is translated back and forth perpendicular to its normal axis of rotation;

step frequency shifts, in which non-linear changes are observed in the rate of rotor rotation at constant flow speed (these are due to the rotor changing between various possible vibratory modes); and spiking, in which the rate of rotor rotation at constant flow rate drops abruptly before returning to its previous rate (these are due to the rotor hitting the wall of the rotor chamber).

Instabilities have persisted in McNabb meters for many years, in spite of repeated attempts (e.g., those of Hoppe and of Bullock et al cited hereinafter) to eliminate them by improved mechanical design. To date these have proven unsuccessful, and compensation for the instabilities has been provided via computer software in the signal processing electronics.

The tight dimensional tolerances inherent in the McNabb design require in-line filters to remove particulate contamination that otherwise clogs the instrument and require its being taken out of service for cleaning. Additionally, contaminant buildup on the surfaces of moving parts in the McNabb meter lead to upward shifts of the operating frequency.

The rotor element in a McNabb meter must be small and lightweight and have a density closely approximating that of the density of the fluid being measured. These requirements lead to the use of optical means of sensing the rotational velocity of the wheel. Since the McNabb meter is generally made with an opaque plastic or metal body, optical sensing generally requires the use of fiber optics, which impose additional problems of high assembly labor cost, leakage around the fibers, and unpredictable variations in output when contaminants build up on the internal surfaces of the instrument.

Moreover, the start-up characteristics of the McNabb transducer are unpredictable, since the rotor does not have a predetermined setting for a no-flow condition. At rest, varying areas on the rotor of McNabb's apparatus may contact any of several internal surfaces of the instrument, depending on the relative specific gravity of the rotor and fluid and on the mounting attitude of the transducer. Thus, start/stop measurements made with a McNabb flowmeter are unreliable. Start/stop (or metered volume) measurements constitute an important fraction of flow measurement applications and include, for example, a volumetric meter in a soft-drink vending machine that dispenses a first predetermined volume of carbonated water and a second predetermined volume of flavored syrup into a cup during each vend.

Hoppe, in U.S. Pat. No. 3,927,568, taught a number of rotor geometries to improve the linearity of a McNabb flow transducer.

Hoppe, in U.S. Pat. No. 4,015,474, subsequently taught an improvement to the McNabb design that improved rotor stability in a low flow rate regime. At commonly encountered volumetric flow rates Hoppe's device was subject to both axial and planar wobble.

Bullock et al, in U.S. Pat. No. 4,833,925, taught the use of a asymmetrical and unbalanced rotor element to reduce the severity of random frequency step shifts in transducers of the basic McNabb design. Although the unbalanced rotor element aided in reducing step shifts, it worsened wobble problems and degraded signal quality.

SUMMARY OF THE INVENTION

It is an object of the invention to provide a fluid volume sensor or flow transducer of the type employing a rotor and a swirl chamber and that can be constructed without requiring close dimensional tolerances between moving and stationary parts.

It is a further object of the invention to provide a fluid volume sensor that can be used with gases, with liquids, or with a two-phase mixture thereof.

It is yet a further object of the invention to provide a volumetric flow transducer of the type employing a rotating element in which the rotating element is mechanically supported at low flow rates, but is supported by the fluent medium at higher flow rates.

It is an object of this invention to provide a flow transducer of the type that uses a swirl chamber and a fluid-supported rotor that will operate in a start-stop mode.

It is an additional object of this invention to provide a flow transducer of the type that uses a swirl chamber and a fluid-supported rotor that will operate in any chosen mounting attitude.

It is a further object of this invention to provide a flow transducer of the type employing a rotor and a swirl chamber that can be constructed with a variety of shapes and numbers of jets in the swirl chamber, and with a variety of rotor configurations.

DESCRIPTION OF THE DRAWING

FIG. 3 of the drawing is an exploded view of a wetted module of the invention.

FIG. 4 of the drawing is an elevational view of the inlet housing of the wetted module shown in FIG. 3. FIG. 4 presents a view of elements of the structure that are hidden in FIG. 3.

FIG. 5 of the drawing is a cross-sectional view of an opto-electronic module of the invention.

DETAILED DESCRIPTION

Figure 1:
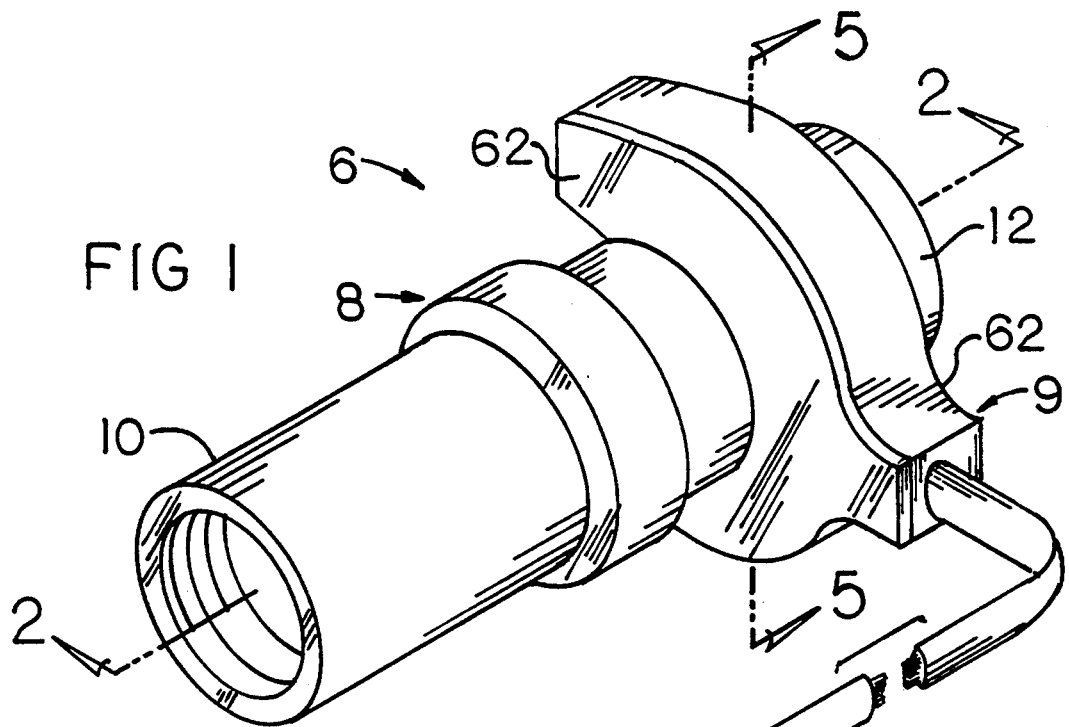
FIG. 1 of the drawing is an elevational view of the transducer of the invention, showing an opto-electronic module clipped around the rotor chamber of the wetted module.

A preferred embodiment of a flow transducer 6 of the invention is shown in an elevational view in FIG. 1 of the drawing. The overall instrument comprises a wetted module 8 and an opto-electronic module 9. The two modules 8, 9 are designed so that the opto-electronic module 9 can be springably snapped about or slid over the end of a wetted module 8. Since, as will be discussed at greater detail subsequently herein, the wetted module 8 may be made at low cost, this overall design for the transducer allows a user to dispose of a used wetted module 8, and to subsequently reuse the opto-electronic module 9.

The wetted module 8 is conveniently made from an inlet housing 10 and an outlet housing 12 that are bonded (e.g., by the use of adhesives, welding, or other joining techniques known to the art) at a joint 14. This provides a continuous flow path through the wetted module 8. The outlet housing 12 is preferably made of a material that is translucent or transparent (e.g., a polycarbonate plastic) at a frequency of electromagnetic radiation that may be supplied from components in the opto-electronic module 9 (e.g., near-infrared radiation supplied from a GaAs infrared emitting diode). It will be understood by those skilled in the art that other choices of electromagnetic frequency and of materials (e.g. microwave radiation used with an insulating outlet housing) would be preferred in other applications (e.g., measuring the flow of an optically opaque fluid with a low electrical conductance).

Figure 2A:
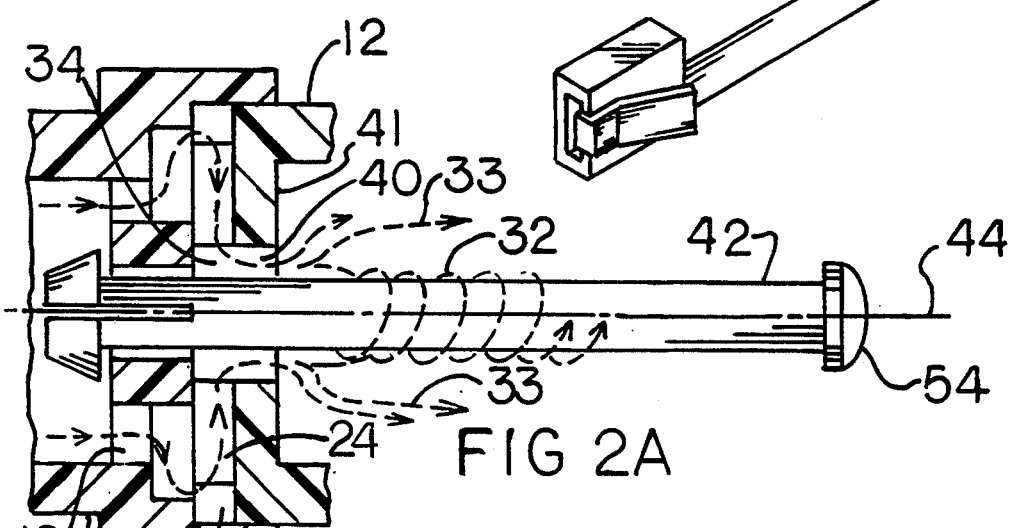
FIG. 2a of the drawing is a detailed cross-sectional view of the volute generator portion of a wetted module that shows some of the flow paths.
Figure 2:
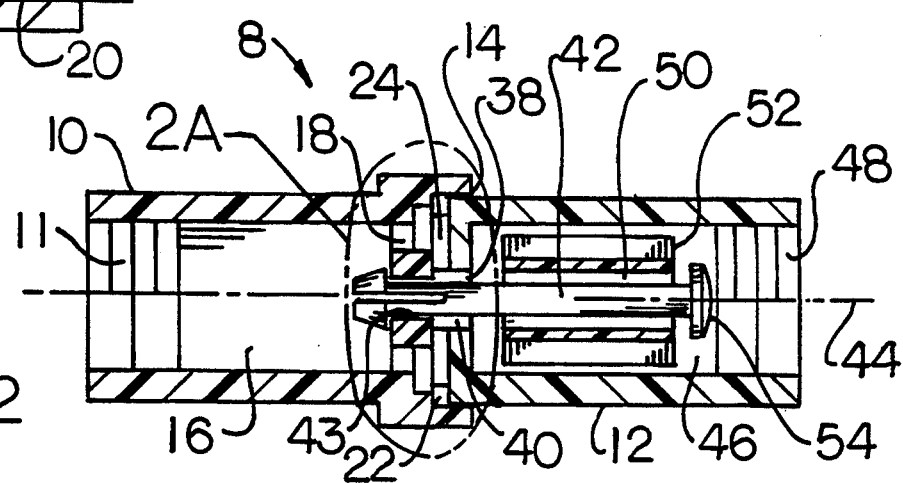
FIG. 2 of the drawing is a cross-sectional view of an assembled wetted module.

As shown in FIG. 2 of the drawing, inlet housing 10 includes an inlet port 11 connected to a distribution chamber 16 that distributes fluid to one or more inlet conduits 18. As shown in greater detail in FIGS. 2a-4 of the drawing, each inlet conduit 18 opens into an inlet manifold 20 that may be a toroidal ring with a generally square cross-section. The manifold 20 feeds a plurality of jets 24, each of which extends from an inlet 22 to an outlet 36. The side walls of a jet 24 are formed by a recess 26 in an upstream end face 25 of the outlet housing 12 and by a face plate 28 on the downstream face of the end wall 27 of the inlet housing 10. The recesses 26 and corresponding jet flats 30 in the end face 25 provide jets 24 that are parallel to, but offset from, radii of the end face 25. Thus, each fluid jet 24 is roughly tangential to volute chamber 34, whereby a pronounced swirl is imparted to fluid in the volute chamber 34.

It will be apparent to those skilled in the art that a variety of cross-sections can be used for the jet 24. Moreover, the jet 24 may have a variety of longitudinal orientations other than being in a plane perpendicular to the flow axis 44 of the transducer 6. Since the jet 24 acts to feed fluid into the volute chamber 34 with a non-axial velocity component so as to impart a swirl to the fluid, the longitudinal orientation of the jet (i.e., a fictitious line or curve extending from the jet inlet 22 to the jet outlet 36) must be skewed with respect to the flow axis 44.

On emerging from the volute chamber 34 a portion 32 of the flowing fluid follows a generally helical path about a tension shaft 42. The balance of the flowing fluid 33 swirls between the outer diameter of the rotor 52 and the inside of the rotor chamber 46 as it moves down the axis 44 of the device towards the outlet port 48.

A portion of the volute chamber 34 consists of a lumen 40 formed in the upstream wall 41 of the rotor chamber 46. This lumen 40 terminates at a lip 38, beyond which the diameter expands immediately to form a rotor chamber 46. An inner surface of the volute chamber lumen 40 is provided by the tension shaft 42, which is inserted into a shaft-retaining hole 43 centrally formed in an end of the inlet housing 10.

Although the various figures of the drawing show a structure in which there are four jets 24, it may be noted that any number of jets may be used in the flow transducer of the invention. Experiments have shown that although the number of jets 24 does not appear to be important, it is preferred that the total jet area (i.e. the area of the sole jet in a single jet unit, or the sum of the cross-sectional areas of all Jets in a multi-jet unit) is approximately equal to the cross-sectional area of that portion of the volute chamber that can be filled with fluid. In the transducer shown in the figure the portion of the volute chamber 34 that can be filled with fluid is the volute chamber lumen 40, which has a cross-sectional area equal to that of the volute chamber 34 minus the cross-sectional area of the tension shaft 42.

The rotor chamber 46 extends downstream from the volute chamber lip 38 to an outlet port 48. The diameter of this cylindrical rotor chamber 46 is preferably about three times the outer diameter of the volute lumen 40. The tension shaft 42 extends from the shaft-retaining hole 43, through the volute chamber lumen 40, and most of the way through the rotor chamber 46. The cylindrical axis of the rotor chamber 46, the center of the shaft retaining hole 43, and the axis of rotation of the rotor 52 are all co-linear, as indicated in FIGS. 2, 2a, and 3 of the drawing with an axial line 44.

The rotor 52 comprises a central lumen 50 in a tubular rotor hub or shell 51. The lumen 50 has an internal diameter substantially larger than the diameter of the tension shaft 42, so that the rotor 50 fits loosely about the shaft 42. Although a variety of sizes will serve, in a preferred embodiment of the invention the rotor lumen 50 has a diameter that is about 1.3–1.4 times the diameter of the tension shaft 42. The effective outer diameter of the rotor 52, as set by the maximum radial extent of rotor lobes 53, is selected to be substantially smaller than the inner diameter of the rotor chamber 46. In a preferred embodiment the inner diameter of the rotor chamber 46 is about 1.2–1.3 times the effective outer diameter of the rotor 52. This is a stark contrast to the prior art of McNabb in which several dimensional rotor tolerances are less than $+/-6.3$ $\mu$m (0.00025 inch).

A rotor 52 will operate with two lobes 53, or with any greater number of lobes 53. A preferred rotor 52, however, has four lobes 53. In the preferred embodiment of the invention the rotation rate of the rotor 52 is measured by counting the rate at which the lobes 53 intersect a beam of infrared radiation. This implies that the rotor lobe 53 should be made of a material that is relatively opaque or reflective at the selected wavelength in order to provide an improved signal-to-noise ratio at the photodetector. Forming the lobed rotor 52 from an extruded section of polyvinyl chloride provides a convenient way of doing this for a rotor that is to be used with water-base fluent media, or with other media that are chemically compatible with PVC. It is desirable, but by no means necessary, that the rotor material be chosen to have a specific gravity close to that of the fluent medium.

The length of rotor 52 is selected so that it fits loosely between the volute chamber lip 38 and the thrust reverser 54 on the downstream end of the tension shaft 42. In a preferred embodiment, the rotor 52 is free to move back and forth along the tension shaft 42 for a distance equal to about one quarter of the length of the rotor 52—i.e., the rotor length is about two thirds of the distance from the wall 41 to the thrust reverser 54. In the preferred embodiment the length of the rotor 52 is about twice its outer diameter.

Tension shaft 42 has a low friction surface and is preferably fabricated from polytetrafluorethylene or alloys thereof. The shaft 42 is fastened to the body of the wetted module 8 at its upstream end (e.g., by inserting an expandable slotted end portion 55 thereof into a shaft-retaining hole 43), and has a flow reverser 54 at its downstream end. As will be subsequently discussed herein, the attachment of the shaft 42 to the body of the module 8 need be neither rigid nor particularly precise, as hydrodynamic forces from fluid flowing through the transducer act to align the shaft 42 into coaxiality with the flow axis 44. The diameter of the tension shaft 42 is substantially less than the inner diameter of the rotor lumen 50 so that the rotor 52 fits loosely on the shaft 42. In a preferred embodiment of the transducer in which the outlet housing diameter is about two centimeters, the inner diameter of the lumen 50 is 1.2–1.5 times larger than the diameter of the tension shaft 42.

The operation of the transducer of the invention can be understood by considering several different flow regimes. As an initial example, consider the case in which flow is initiated in a previously quiescent device. When at rest in a horizontally oriented transducer the rotor 52 is usually supported on a portion of the tension shaft 42 so that its lobes 53 are spaced apart from the inner wall of the rotor chamber 46. If the rotor 52 is denser than the working fluid, and the transducer is in a horizontal position, similar to that shown in FIG. 2 of the drawing, the interior surface of the rotor lumen will bear on the upper side of the tension shaft 42 and the rotor 52 will hang in the rotor chamber 46 in a slightly eccentric position. On the other hand, if the transducer is mounted so that the tension shaft 42 is vertical, the rotor 52 will bear either on the upstream end face 41 of the rotor chamber adjacent the volute chamber lip 38, or on the thrust reverser 54, depending on the density of the rotor 52 and on which end of the apparatus is elevated. All these possible initial positions of the rotor are low 'stiction' positions from which it is relatively easy to initiate rotation. High start-up friction positions (e.g., having one or more of the rotor lobes 53 bearing on the internal wall of the rotor chamber 46) are thus avoided.

When flow is initiated, fluid flows into the inlet 11 of the wetted module 8 along the axis 44 of the device, and then passes through the inlet conduit 18 to form a vortex in the volute chamber 34. On exiting the volute chamber 34, a portion 32 of the fluid flows along the tension shaft 42 through the rotor lumen 50 and impinges upon the thrust reverser 54. A greater portion of the fluid 33 flows between the rotor 52 and the inner wall of the rotor chamber 46, as is commonly the case in turbine flow transducers, and acts upon the lobes 53 to rotate the rotor 52. The fluid flow also acts upon the rotor 52 to translate it along the tension shaft 42 toward the bluff-body thrust reverser 54.

At very low flow rates the rotor 52 rotates about the shaft 42 and may bear on the shaft 43 or on the thrust reverser 54, depending on the mounting attitude of the transducer. At flow rates that are more commonly encountered, however, the flowing fluid maintains the rotor 52 out of contact with all surfaces. The fluid flowing through the rotor lumen 50 lifts the rotor 50 off the shaft 42. At the downstream end of the rotor lumen 52 this fluid encounters the thrust reverser 54 that, in the illustrated embodiment of the drawing, is attached to the downstream end of the tension shaft 42. Fluid emerging from the lumen forms a conical, fan-shaped pattern and flows outward toward the wall of the rotor chamber 46. In flowing around the thrust reverser 54, the fluid provides a substantial fluid support that ensures that the downstream end of the rotor 52 does not touch the thrust reverser 54. Contact between the rotor 52 and the upstream wall 41 of the rotor chamber 46 is of no concern, as axial hydrodynamic force components push the rotor 52 downstream and away from the wall 41.

Experiments have shown that fluid flowing through the cylindrical rotor chamber 46 will also keep the rotor 52 out of contact with the inside cylindrical wall of the rotor chamber 46—i.e., once the rotor has lifted off the tension shaft 42, the rotor is self-centering and the shaft is useful only to support the thrust reverser 54. In one experiment (not shown in the drawing) a bluff body, supported by a rod inserted through the outlet port of a transducer, acted as a thrust reverser. A simple cylindrical shaft (which did not have a thrust reverser on it) was inserted through the inlet port and thence through the shaft retaining hole 43 and through the lumen 50 of a rotor 52. This shaft kept the rotor lobes 53 out of contact with the wall of the rotor chamber 46 before flow was initiated. Once fluid was flowing through the experimental device, the cylindrical shaft was extracted via the inlet port, and the rotor continued to run.

Other experiments have shown that "fluids" measurable by the apparatus of the invention can include two-phase fluent media—e.g., water with air bubbles in it. Prior art swirl transducers, such as McNabb's apparatus, that require tight dimensional tolerances, are commonly stalled by the presence of small amounts of entrained gases. Tests on the apparatus of the invention, carried out with aerated water, indicate that entrained bubbles follow the flow of the greater portion of fluid 33, and flow between the rotor lobes 53 and the wall of the rotor chamber 46. In these tests water continued to flow through the rotor lumen 50 and to maintain the integrity of the liquid support adjacent the thrust reverser 54.

The speed of rotation of the rotor 52 may be measured by optical techniques which are well known in the art and which have been improved upon by Shoptaw in U.S. Pat. No. 4,887,469, the disclosure of which is herein incorporated by reference. An electro-optic sensing head and component carrier 62 that is preferably used with the transducer of the present invention is shown in cross-section in FIG. 5 of the drawing. A source 58 of radiation (which is preferably near-infrared radiation generated by an infrared light emitting diode, but which could also be visible light from another suitable light source) defines a beam having an axis 56 that extends to a corresponding detector 60 (e.g., a silicon phototransistor). The carrier 62 is made of a material transparent to the selected radiation (a polycarbonate plastic is used in the preferred embodiment). A portion 64 of the carrier is shaped like the letter "C" and has a circular cross-section that extends through more than 180°. This portion has an internal diameter slightly larger than the outer diameter of the translucent outlet housing 12. Thus, the component carrier 62 can be slid over the outlet end of the outlet housing 12, or the two free ends 66, 68 of the carrier 62 can be springably moved away from each other so that the carrier 62 can be pushed over the outlet housing 12 to achieve the mounting geometry generally shown in FIG. 1 of the drawing.

Although the present invention has been described with respect to several preferred embodiments, many modifications and alterations can be made without departing from the invention. Specifically, although the foregoing discussion has been directed at a turbine meter that uses known electro-optical techniques to measure the rotation rate of the turbine, other means (e.g. using ferromagnetic elements in the rotor lobes and using the Hall effect to measure the turbine speed) are known to the art. Accordingly, it is intended that all such modifications and alterations be considered as within the spirit and scope of the invention .as defined in the attached claims.

What is desired to be secured by Letters Patent is:

1. In a volume or rate of flow measurement apparatus having a housing wherein a swirl imparted to a fluid by a jet rotates a rotor about a shaft, said rotor having an axial lumen therethrough, said shaft disposed in said lumen, said shaft having an upstream end and a downstream end, an improvement comprising
   a cylindrical volute chamber formed in said housing, a diameter of said volute chamber smaller than an outer diameter of said rotor, said jet having an outlet in a wall of said volute chamber,
   a cylindrical rotor chamber formed in said housing, said rotor chamber coaxial with said volute chamber, said rotor chamber downstream of said volute chamber, and
   a thrust reverser downstream of said rotor, said thrust reverser coaxial with said rotor chamber, said thrust reverser supported by said shaft,
wherein said first end of said shaft is attached to said housing and said second end of said shaft is not attached to said housing.

2. Apparatus of claim 1 wherein the total jet area equals the cross-sectional area of that portion of said volute chamber that can be filled with fluid.

3. Apparatus of claim 1 wherein said rotor comprises a cylindrical shell portion surrounding said lumen, said shell having lobes on an external surface thereof, said lobes opaque to electromagnetic radiation of a predetermined frequency.

4. Apparatus of claim 1 wherein the diameter of said lumen is at least one and one quarter times the diameter of said shaft.

5. Apparatus of claim 1 wherein said shaft is coaxial with said rotor chamber, and wherein the sum of the radius of said rotor and the radius of said lumen, minus the diameter of said shaft, is less than the radius of said rotor chamber, whereby said rotor does not contact the inner surface of said rotor chamber.

6. In a flowmeter having a wetted module body with an inlet port, an outlet port, a flow path intermediate said inlet and said outlet ports, and an axis extending between said inlet and said outlet ports,
   a rotor rotatable about said axis, said rotor comprising a cylindrical body having an upstream end and a downstream end, said rotor having a lumen therethrough, said lumen coaxial with said rotor body, said lumen having a diameter,
   a shaft having an upstream end and a downstream end, said shaft disposed within said lumen said upstream end of said shaft attached to a portion of said wetted module body at a point on said axis, said downstream end of said shaft not connected to said wetted module body, and
   a thrust reverser having a diameter greater than said diameter of said lumen, said thrust reverser adjacent said downstream end of said shaft.

7. Apparatus of claim 6 wherein said shaft has a length greater than one and one half times the length of said rotor, whereby fluid flowing along said flow path translates said rotor along said shaft for a distance equal to one half of said length of said rotor.

8. Apparatus of claim 6 wherein said diameter of said lumen is at least thirty percent greater than the diameter of said shaft, whereby fluid flows between said shaft and said rotor.

9. Apparatus of claim 6 wherein said rotor comprises lobes on an external surface of said cylindrical body, said lobes opaque to electromagnetic radiation of a predetermined frequency.

10. A flow transducer comprising a wetted module and an opto-electronics module, said wetted module comprising
   a generally cylindrical inlet housing having an upstream end and a downstream end, said inlet housing comprising an inlet port at said upstream end thereof and a first wall at said downstream end thereof, said first wall having an upstream face and a downstream face, said inlet housing further comprising a plurality of holes through said first wall, wherein a first, shaft-retaining hole, of said plurality of holes is located on the cylindrical axis of said inlet housing, and a second, inlet conduit hole, of said plurality of holes is displaced from said axis,
   a generally cylindrical outlet housing having an upstream end and a downstream end, said outlet housing comprising an outlet port at said downstream end thereof, said outlet housing translucent to electromagnetic radiation of a predetermined frequency,
   said upstream end of said outlet housing co-axially joined to said downstream end of said inlet housing adjacent said first wall, said outlet housing comprising a second wall having an upstream face whereon are disposed a plurality of raised channel-defining portions, whereby a manifold and a closed jet channel are formed when said outlet housing is joined to said inlet housing,
   said outlet housing further comprising an axial volute chamber hole through said second wall, the diameter of said volute chamber hole larger than the diameter of said shaft-retaining hole,
   said outlet housing further comprising a cylindrical rotor chamber intermediate said second wall and said outlet port, said rotor chamber coaxial with said volute chamber hole, said rotor chamber having a diameter larger than said volute chamber hole,
   a rotor comprising a cylindrical tubular body having an axial lumen therethrough, said rotor having two or more rotor lobes extending from the outer surface of said tubular body, each said rotor lobe opaque to said radiation, said rotor having an outer diameter less than said diameter of said rotor chamber, and a shaft having an upstream end and a downstream end, said shaft having a thrust reverser at said downstream end thereof, a diameter of said shaft less than the diameter of said rotor lumen, said upstream end of said shaft inserted through said volute chamber hole into said shaft-retaining hole, said shaft further comprising attachment means on said upstream end thereof attaching said shaft to said first wall;

said opto-electronic module removeably positioned external to said rotor chamber, said opto-electronic module comprising a source of said electromagnetic radiation and a detector of said electromagnetic radiation, said source defining a beam of radiation extending to said detector, said beam intercepted by a said rotor lobe.

11. A transducer of claim 10 wherein said shaft attachment means comprise flexible attachment means allowing said shaft to move under the influence of gravity and fluid buoyancy into an attitude skewed with respect to said axis of said outlet housing when said fluid is stationary, said flexible attachment means additionally allowing said shaft to move under the influence of hydrodynamic forces into coaxiality with said axis of said outlet housing when said fluid flows through said transducer at a flow rate in excess of a predetermined value.

12. A transducer of claim 10 wherein said shaft comprises an expandable portion at said upstream end thereof, said expandable portion having an outer diameter greater than the diameter of said shaft-retaining hole, said expandable portion deformably inserted through said shaft-retaining hole and thereafter expanding to retain said shaft in said hole.

13. A transducer of claim 10 wherein the longitudinal orientation of said inlet conduit is not co-linear with a radius of said volute chamber, whereby fluid flowing through said inlet conduit enters said volute chamber with a tangential component of flow velocity.

14. A transducer of claim 13 further comprising a plurality of said inlet conduits.

15. A method of measuring the volumetric flow of a fluent medium flowing in a predetermined direction through a generally cylindrical body, said method comprising the steps of a) causing said medium to flow through a jet, said jet non-coaxial with said body, said jet having a downstream end terminating in a wall of a volute chamber formed in said body, b) causing said medium to flow through said volute chamber and thence into a rotor chamber formed in said body, said rotor chamber containing a rotor having an axial lumen therethrough, said rotor chamber further containing a shaft extending from said volute chamber through said axial lumen, c) causing a first portion of said medium to flow through said lumen, thereby separating said rotor from contact with said shaft, d) causing a second portion of said medium to flow through said rotor chamber intermediate said rotor and an interior wall of said rotor chamber, thereby causing said rotor to rotate, e) impinging said first portion of said medium on a thrust reverser adjacent an end of said shaft downstream of said volute chamber, thereby forming a fluid support means preventing said rotor from contacting said thrust reverser, and f) measuring the rate of rotation of said rotor as an indicator of said volumetric flow.

16. A method of claim 15 wherein said fluent medium comprises a two phase mixture of a liquid and a gas.

* * * * *